United States Patent

[11] 3,602,789

| [72] | Inventor | Rudolf Leistner<br>Munich, Germany |
|---|---|---|
| [21] | Appl. No. | 872,252 |
| [22] | Filed | Oct. 29, 1969 |
| [45] | Patented | Aug. 31, 1971 |
| [73] | Assignee | Niezoldi & Kramer GmbH<br>Munich, Germany |
| [32] | Priority | Dec. 4, 1968 |
| [33] | | Germany |
| [31] | | P 18 12 598.9 |

[54] CIRCUIT ARRANGEMENT FOR CONTROLLING THE NUMBER AND DIRECTION OF REVOLUTION OF A FRACTIONAL DC MOTOR IN MOVIE CAMERAS
10 Claims, 3 Drawing Figs.

[52] U.S. Cl. .................................................. 318/257,
318/280, 318/293, 318/305
[51] Int. Cl. .......................................................... H02p 5/00
[50] Field of Search ............................................ 318/257,
293, 280, 305

[56] References Cited
UNITED STATES PATENTS
3,022,454  2/1962  Millis .......................... 318/345
3,303,403  2/1967  Bonanno ..................... 318/257
3,496,441  2/1970  Heider et al. ................ 318/257

Primary Examiner—Oris L. Rader
Assistant Examiner—K. L. Crosson
Attorney—Ernest F. Marmorek ABSTRACT: The present invention relates to a control circuit for controlling the number and the direction of the revolution of a movie camera motor and in order to drive the motor in one direction a semiconductor device is employed the base electrode of which is connected to a split potentiometer and another electrode of which is connected to one energizing terminal of the motor. By varying the base voltage with the help of the potentiometer the motor is running at different speeds and by connecting one of the energizing terminals of the motor to one side of a voltage source the motor will run in one direction. In order to have the motor running in the opposite direction, another semiconductor device when selected to be turned on connects the energizing terminal of the motor to another terminal of the voltage source and similarly the base electrode of the last-mentioned semiconductor device provides a selectively variable potential of the base electrode whereby the motor can run in this direction also at varying speeds.

CIRCUIT ARRANGEMENT FOR CONTROLLING THE NUMBER AND DIRECTION OF REVOLUTION OF A FRACTIONAL DC MOTOR IN MOVIE CAMERAS

FIELD OF THE INVENTION

The present invention relates to a circuit arrangement for controlling the number and the direction of revolution of fractional DC motors in movie cameras.

BACKGROUND OF THE INVENTION

In movie cameras it has been already known to use electric drives for the continuous setting of the focal length of the objective, and in which the driving motor can be driven forwards and backwards. This was accomplished by a pair of knobs, one for the forward and the other for the backward drive.

The above-described drive, however, has a disadvantage in that the setting of the focal length can be affected only with one or several but fixed speeds.

It is, however, desirable during the picture taking process that the focal length could be continuously slowly or quickly set to smaller or larger values.

SUMMARY OF THE INVENTION

It is, therefore, an object of the present invention to provide an arrangement for the control of the number and the direction of revolution of the electric drives in movie cameras and which enables simple and quick setting of the focal length as desired.

With the above object in view, the invention provides a sliding or rotary type operating mechanism which affects the connection of the energizing terminals of a driving motor over a respective pair of contact rails to one terminal of a unidirectional potential source and also over a collector or emitter circuit of a pair of transistors which transistors with another electrode thereof are returned over a resistor to the other terminal of the unidirectional potential source. The contact rails are connected to one end of a respective pair of variable resistors which with their other end are returned to the other terminal of the unidirectional potential source. The connection of one of the motor terminals to the respective variable resistor is affected through a slider arm moving synchronously with a slider arm engaging the contact rail associated with the variable resistors and connecting such contact rail to the control electrode of the respective transistor while the collector or emitter electrodes of the transistors are returned to the other of the motor terminals.

According to the invention the movable parts of the contact rails, and of the variable resistors, that is the slider arms, forming a pair of sets, can be adjusted together and, a respective set of contact rails and the associated variable resistors can be selected while the other set is excluded from the circuit.

According to the invention, an intermittent point of the contact rails provides for a null position with respect to both contact rails and a turning of the slider or of the knob in one direction connects the contact rail with the associated set of variable resistors.

The invention provides that the variable resistors are preferable slider type resistors.

In another embodiment of the invention the contact rails and the associated variable resistors are arranged about a central axis so that a symmetrically arranged operating means moving a slider arm connects certain contact rails only with the associated variable resistors. In this embodiment the operating mechanism of the slider arm is provided with a knob having an intermediate position as the null position.

Preferably in both embodiments the variable resistors are made in the form of potentiometer resistors.

The invention will become more readily apparent from the following description of preferred embodiments thereof shown in the accompanying drawings, in which:

BRIEF DESCRIPTION OF THE PREFERRED EMBODIMENTS

Figure 1:
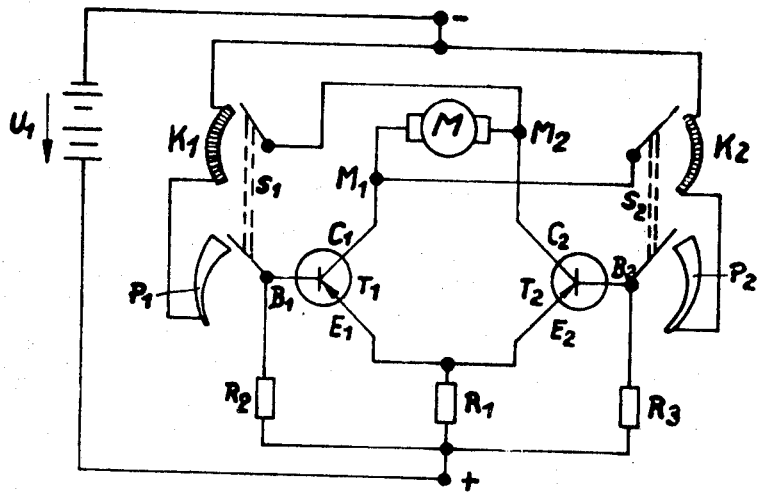
FIG. 1 is a circuit arrangement for controlling the number and direction of revolution of a fractional DC motor, the operating mechanism being in the form of a slider.

With reference to FIG. 1 a motor M is shown having its terminals M1 and M2 connected to a respective pair of slider arm of an associated slider S1 and S2 to a variable portion of contact means K1 and K2, respectively, which is in the form of a variable resistor, and one end of each of which is being connected to the negative terminal of a unidirectional voltage source U1. The motor terminals M1 and M2 are also connected to the collector electrodes of a pair of transistors T1 and T2. More specifically, motor terminal M1 is connected to the collector electrode C1 of transistor T1 while motor terminal M2 is connected to the collector electrode C2 of transistor T2. Transistors T1 and T2 have also emitter electrodes E1 and E2 which are connected to a common resistor R1 and thereby returned to the positive terminal of the voltage source U1.

The base electrodes B1 and B2 of transistors T1 and T2 are returned, respectively, through a pair of resistors R2 and R3 to the positive terminal of voltage source U1. The base electrodes B1 and B2 are also connected each through a slider arm of sliders S1 and S2 to a variable potentiometer P1 and P2, respectively, one end of which is connected with the variable resistor K1 and K2, respectively.

The number of revolutions of the motor M is affected thereby that the working point of transistors T1 and T2 becomes shifted, depending on whether slider S1 connects into the circuit the variable resistor K1 and the variable potentiometer P1 which then varies the input to transistor T1, or whether slider S2 connects the variable resistor K2 and the associated potentiometer P2 into circuit and thereby varying the input to transistor T2. It is noted that switching or operating of slider S1 causes slider S2 to remain inoperative and vice versa.

It is also noted that operation of slider S1 or S2 causes the motor to run in a different direction since the motor is connected by each slider to a different or opposite terminal of the voltage source U1, while the speed of the motor is effected, as above described, by varying the input to the respective transistor connected into the circuit by the then operating slider S1 or S2.

Figure 2:
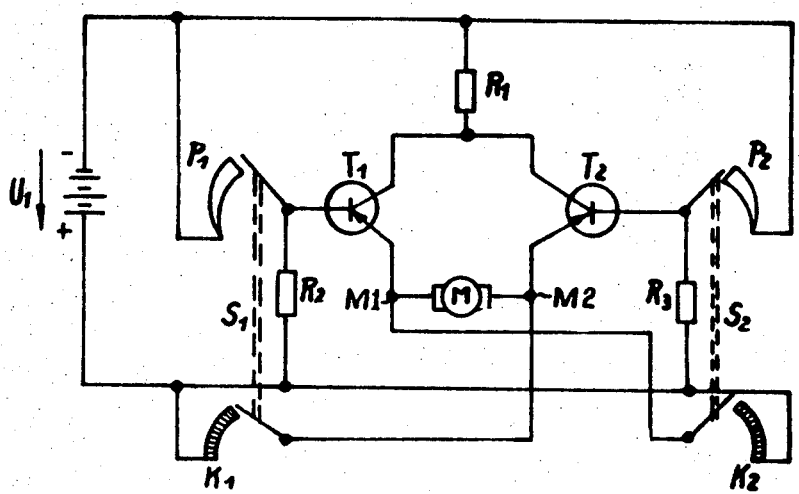
FIG. 2 is an embodiment similar to FIG. 1 with the motor being in the emitter circuit of the transistor.

FIG. 2 represents a circuit arrangement similar to the one shown in FIG. 1 with the distinction that motor M in FIG. 2 is connected with its terminals M1 and M2 in the emitter circuit of transistors T1 and T2. The resistor R1 is connected between the negative terminal of the unidirectional voltage source U1 and the interconnected collector electrodes of the transistors T1 and T2. The operation of this circuit is similar to the one shown in FIG. 1.

Figure 3:
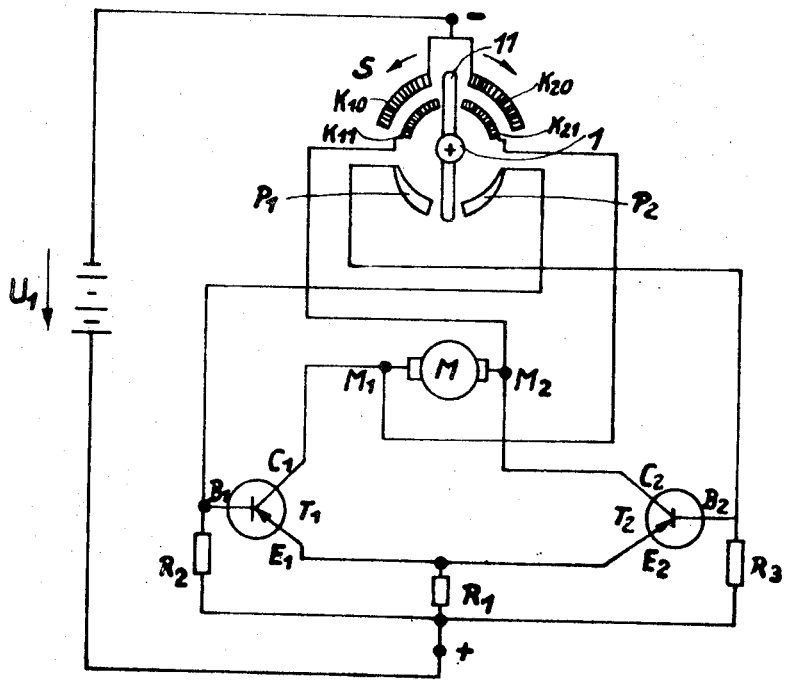
FIG. 3 is a further embodiment of the invention according to which the operating mechanism is in the form a rotary switch.

FIG. 3 illustrates a further embodiment of the invention, namely employing a rotary switch S as the operating mechanism of the control apparatus, in which a set of variable resistors K10, K11 and K20, K21 with their associated potentiometers P1 and P2 are arranged about a central axis 1. Rotary switch S is provided with a diametrical slider arm 11 which, as shown in FIG. 3, is capable of interconnecting variable resistors K10, K11 with potentiometer P1 to cause the motor to run in one direction and variable resistors K20, K21 with their associated potentiometer P2 to cause the motor run in another, that is, in the opposite direction. The variation of the motor speed is caused here also by varying the slider arm position on the variable resistors and the associated potentiometer to cause to vary the input to the respective transistors T1 or T2.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

I claim:

1. Circuit arrangement for controlling the number and direction of revolutions of a fractional DC motor in a movie camera comprising a pair of semiconductor devices having at least one control electrode and at least a pair of further electrodes, means connecting one of said further electrodes of one of said pair of semiconductor devices to an energizing terminal of said motor, means connecting one of said further electrodes of the other of said pair of semiconductor devices to another energizing terminal of said motor, a pair of variable resistor means one of which with a first contactor means thereof connects one of said motor terminals to one terminal of a source of potential and with a second contactor means connects the other of said motor terminals through one of said semiconductor devices to another terminal of said source of potential, said second contact means of said variable resistor means connecting a control electrode of one of said semiconductor devices to said one terminal of said source for causing rotation of said motor in one direction at a speed defined by a position of said contactor means on said variable resistor means, the other of said variable resistor means connecting a control electrode of the other of said semiconductor devices with one contactor means thereof to said another terminal of said source of potential, second contactor means connecting the other of said variable resistor means to said one energizing terminal of said motor for causing rotation of said motor in another direction and at a speed defined by a position of said contactor means associated with said other variable resistor means wherein each of said variable resistor means comprises potentiometer means, said contactor means comprising slider means for each of said variable resistor means, said slider means including a slider arm connecting the associated one of said variable resistor means to said one motor terminal, and another slider arm connecting said associated potentiometer means to the control electrode of said semiconductor device, said one and said another slider arm moving together.

2. The circuit arrangement as claimed in claim 1, wherein said second contactor means is a separate slider arm associated with each of said variable resistors, each of said slider arms being connected to a different one of said motor terminals, whereby operation of a respective slider arm connects a different one of said motor terminals to the same terminal of said potential source.

3. The circuit arrangement as claimed in claim 2, including means for operating one of said slider arms and disconnecting the other of said slider arms from the circuit.

4. The circuit arrangement as claimed in claim 3, wherein said semiconductor device is a three electrode transistor device having a collector electrode, an emitter electrode and a base electrode, each of said collector electrodes being returned to a different one of said motor terminals, the emitter electrodes being returned to a common point at one of said terminals of said potential source, said control electrode being said base electrode.

5. The circuit arrangement as claimed in claim 4, wherein said operating mechanism is a slider having a null position.

6. The circuit arrangement as claimed in claim 1, wherein said semiconductor device is a three electrode transistor device having a collector electrode, an emitter electrode and a base electrode, each of said emitter electrodes being returned to a different one of said motor terminals, said collector electrodes being returned to a terminal of said potential source.

7. The circuit arrangement as claimed in claim 5, wherein said variable resistors are slide rheostats.

8. The circuit arrangement as claimed in claim 1, wherein said variable resistor means are arranged about a central axis in a pair of sets, potentiometer means associated with each of said sets and arranged about said central axis, a slider arm rotatable about said central axis and engaging one of said sets of said variable resistors and the associated potentiometer means, said slider arm interconnecting a set of said variable resistors and said potentiometer means associated with one of said transistor means causing said motor to rotate in one direction, the other set of variable resistor means is arranged about said central axis and having a potentiometer means associated therewith, said slider arm engaging said other set and thereby causing said motor to rotate in an opposite direction, said slider arm having a center null position in which said sets of variable resistor means and said potentiometer means are disconnected from the circuit.

9. The circuit arrangement as claimed in claim 8, wherein said operating mechanism is a rotatable knob.

10. The circuit arrangement as claimed in claim 9, wherein said variable resistor means are arranged on a portion of a circle and are sliding type resistances.